US009531538B2

(12) United States Patent
Chang et al.

(10) Patent No.: US 9,531,538 B2
(45) Date of Patent: *Dec. 27, 2016

(54) CONTROLLING EXPOSURE OF SENSITIVE DATA AND OPERATION USING PROCESS BOUND SECURITY TOKENS IN CLOUD COMPUTING ENVIRONMENT

(71) Applicant: International Business Machines Corporation, Armonk, NY (US)

(72) Inventors: John Y-C. Chang, Austin, TX (US); Ching-Yun CHao, Austin, TX (US); Bertrand Be-Chung Chiu, Austin, TX (US); Ki Hong Park, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,114

(22) Filed: Dec. 11, 2015

(65) Prior Publication Data

US 2016/0099808 A1  Apr. 7, 2016

Related U.S. Application Data

(63) Continuation of application No. 14/485,684, filed on Sep. 13, 2014, now Pat. No. 9,237,020, which is a (Continued)

(51) Int. Cl.
*H04L 9/32* (2006.01)
*H04L 29/06* (2006.01)

(52) U.S. Cl.
CPC ........... *H04L 9/3213* (2013.01); *H04L 9/3247* (2013.01); *H04L 63/0815* (2013.01);
(Continued)

(58) Field of Classification Search
CPC . H04L 63/0815; H04L 9/3213; H04L 63/0823
See application file for complete search history.

(56) References Cited

U.S. PATENT DOCUMENTS 6,711,679 B1 * 3/2004 Guski ................. H04L 63/0428
 713/156
8,632,003 B2 * 1/2014 Sermersheim .......... G06F 21/33
 235/380

(Continued)

*Primary Examiner* — James Turchen
(74) *Attorney, Agent, or Firm* — Robert H. Frantz; Reza Sarbakhsh

(57) ABSTRACT

Exposure of sensitive information to users is controlled using a first security token containing user identity and user credentials to represent the user who requests services, and a second security token containing two other identities, one identifying the token issuer and the other identifying the owning process. When requesting services, the token-owning process sends a security token to indicate who is making the request, and uses its key to digitally sign the request. The token-owning process signs the request to indicate that it endorses the request. A receiving server accepts a request if (1) the token-owning process endorses the request by signing the request; (2) the token is valid (token is signed by its issuer and the digital signature is verified and unexpired); (3) user entity, which can be a real user or a deployment or a server process, that is represented by the token has the authorization to access the specified resources; and (4) the token-owning process is authorized to endorse the user entity represented by the token to access the specified resources.

16 Claims, 4 Drawing Sheets

Related U.S. Application Data continuation of application No. 13/745,942, filed on Jan. 21, 2013, now Pat. No. 9,148,285.

(52) U.S. Cl.
CPC ...... *H04L 63/0823* (2013.01); *H04L 65/4069* (2013.01); *H04L 67/42* (2013.01); *H04L 63/08* (2013.01)

(56) References Cited

U.S. PATENT DOCUMENTS

| | | | | |
|---|---|---|---|---|
| 2003/0188193 | A1* | 10/2003 | Venkataramappa | H04L 63/0815 726/10 |
| 2010/0325441 | A1* | 12/2010 | Laurie | G06F 21/31 713/185 |
| 2012/0254957 | A1* | 10/2012 | Fork | G06F 21/33 726/6 |
| 2013/0019295 | A1* | 1/2013 | Park | H04L 9/3213 726/7 |
| 2013/0086652 | A1* | 4/2013 | Kavantzas | G06F 21/335 726/5 |
| 2014/0007198 | A1* | 1/2014 | Durbha | H04L 63/102 726/4 |
| 2014/0013409 | A1* | 1/2014 | Halageri | H04L 63/0815 726/8 |
| 2014/0020064 | A1* | 1/2014 | Hildebrand | G06F 21/335 726/4 |
| 2014/0068702 | A1* | 3/2014 | Hyndman | G06F 21/41 726/1 |
| 2014/0173693 | A1* | 6/2014 | Bikkula | H04L 63/0815 726/4 |

* cited by examiner

CONTROLLING EXPOSURE OF SENSITIVE DATA AND OPERATION USING PROCESS BOUND SECURITY TOKENS IN CLOUD COMPUTING ENVIRONMENT

CROSS-REFERENCE TO RELATED APPLICATIONS CLAIMING BENEFIT UNDER 35 U.S.C. 120

This is a continuation application of U.S. patent application Ser. No. 14/485,684, filed on Sep. 13, 2014, which was a continuation application of U.S. patent application Ser. No. 13/745,942, filed on Jan. 21, 2013 by John Y-C. Chang, et al.

INCORPORATION BY REFERENCE

The parent U.S. patent application Ser. No. 14/485,684, filed on Sep. 13, 2014, and Ser. No. 13/745,942, filed on Jan. 21, 2013 by John Y-C. Chang, et al., are incorporated by reference in their entireties including drawings.

FIELD OF THE INVENTION

This is a continuation application of U.S. patent application Ser. No. 13/745,942, filed on Jan. 21, 2013 by John Y-C. Chang, et al. The invention generally relates to systems and methods for protecting and controlling the exposure of sensitive information which much be shared between computers, processes, and systems in a distributed computing arrangement, but which should not be exposed to a user or user process.

BACKGROUND OF INVENTION

Cloud computing and distributed computing environments allow for many benefits, including scaling of processing resources to the instantaneous demand, sharing of costs of hardware and software across multiple customers, and dynamic response to unforeseen needs and requirements.

Such distributed, cloud and on-demand systems typically involve multiple processes, computers, and data networks to complete or perform a job or function for a user, where a user may be an actual person or another requesting process. When these distributed resources are properly allocated, configured, and engaged to perform the job, there can be significant amounts of intermediate data shared between them, especially across data networks. When this transmitted data is of a sensitive nature, it is especially useful to protect that data from exposure to or access by the requesting user, whereas such a breach could not only endanger the confidential structure and design of the computing environment, but may also comprise personal information or corporate competitive data.

SUMMARY OF EXEMPLARY EMBODIMENTS OF THE INVENTION

Exposure of sensitive information to users is controlled using a first security token containing user identity and user credentials to represent the user who requests services. A security token contains two other identities, one identifying the token issuer and the other identifying the owning process. When requesting services, the token-owning process sends a security token to indicate who is making the request, and uses its key to digitally sign the request. The token-owning process signs the request to indicate that it endorses the request. A receiving server accepts a request if (1) the token-owning process endorses the request by signing the request; (2) the token is valid (token is signed by its issuer and the digital signature is verified and unexpired); (3) user entity, which can be a real user or a deployment or a server process, that is represented by the token has the authorization to access the specified resources; and (4) the token-owning process is authorized to endorse the user entity represented by the token to access the specified resources.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
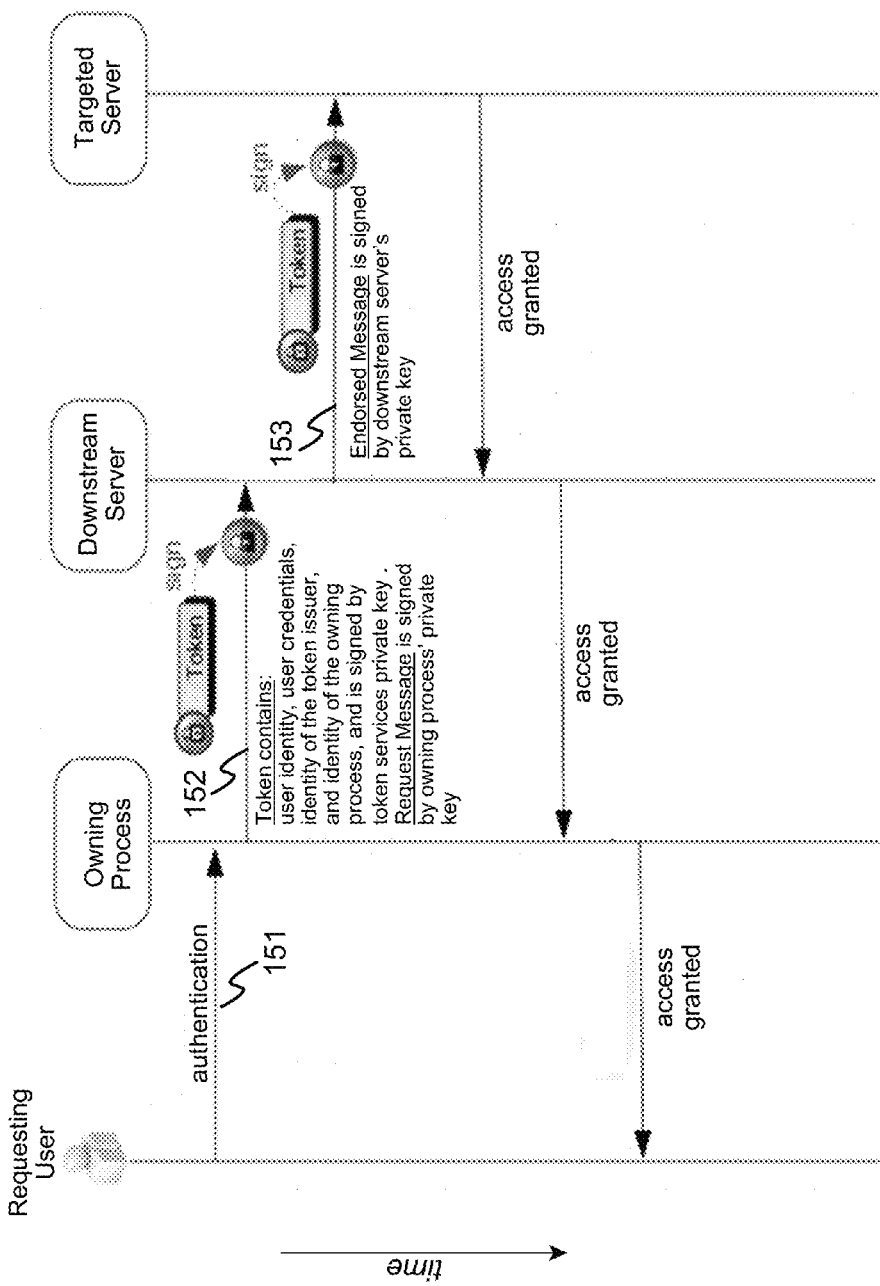
FIG. 1 illustrates a generalized process according to the present invention of using one or more security tokens to endorse a service request on behalf of a requesting user, while protecting sensitive data from exposure to the requesting user.

The inventors of the present invention have recognized problems not yet recognized by those skilled in the relevant arts. A distributed computing arrangement such as a cloud computing infrastructure comprises services provided by multiple server computer processes ("servers" collectively). The servers may include functionality such as interacting with users, managing cloud resource operations, managing cloud resources' configuration data, and managing cloud user and computing device and process identities and credentials. Each server typically manages data of a different level of security sensitivity. A server, for example, may manage user and computing node identity, profile data, authentication, keys and certificate represent data at the highest level of security sensitivity. Another server may interact with users, provide users a view of system resources, although still sensitive, nonetheless represents data that need to be protected at the lowest level of security sensitivity.

The embodiments of the present invention provide a mechanism to control the exposure of sensitive data to users and to computing nodes. Users can only be allowed to access servers at the lowest security sensitivity level. Trusted servers can be allowed to access more sensitive data. Only the most trusted servers can be allowed to access the most sensitive data and the most trusted server.

Overview of Logical Processes.

The following overview is presented for the reader's convenience, but is not intended to be all-inclusive of all embodiments of the invention, nor exhaustive of all variations in embodiments. According to various aspects of the present invention, data are managed by server processes. In this invention, defining and using security tokens which are owned by server processes are introduced into the relevant arts for data protection. User tokens represent user identity and user credentials. But user tokens in embodiments according to this invention are owned by the server process that interact with users, not by the user, the user's device, or a user process.

Still further, a server process is represented by a second security token, and logically a server process owns that server security token. With the notion that token is owned by server process, an authorization policy can be defined to control access to sensitive data and sensitive operations based on which server owns the security token.

Access control based on token process ownership is provided in addition to user identity based access control. User identity-based access control authorizes user to access sensitive data, and the token process ownership-based access controls how the user can access the data.

Generalized Logical Process.

In general, a logical process according to the present invention uses at least one security token which contains user identity and user credentials to represent the user who is requesting services from a server, where the term "user" may refer to a device being operated by a human user or it may refer to another process. The security token (or tokens) contains two other identities, an identity of the token issuer, and an identity of the owning process.

A possible scenario is when a user requests services of a server, the user first authenticates (151) to the server process using authentication credentials such as user ID and password. After a successful authentication, at least one security token is issued to represent the user identity (152). Typically, the owning process of a security token is the server process that received the user request. Typically, the issuer of the security token is a token services. The security token is digitally signed by the token services using a private key of the token service. The security token contains the issuer key name that indicates the key that is used to sign the security token.

During operation, a process receiving a security token can use the issuer process name and the issuer key name to uniquely identify the public key needed to verify the token issuer digital signature. The token also contains an owning process key name which indicates the key the owning process must use to digitally sign request messages using a security token to prove the ownership of a security token.

Assuming that a request message and a security token is received by a downstream server process, and that the validity and integrity of the request message and the security token is verified, and the request is authorized, the receiving server process can make downstream requests (152) on behalf of the original requester by sending the received security token along with its own server security token, and endorse the downstream request by digitally signing the request message by using its server private key that is identified by the owing process private key in its owner server security token.

SPECIFIC EMBODIMENT EXAMPLE

Figure 2:
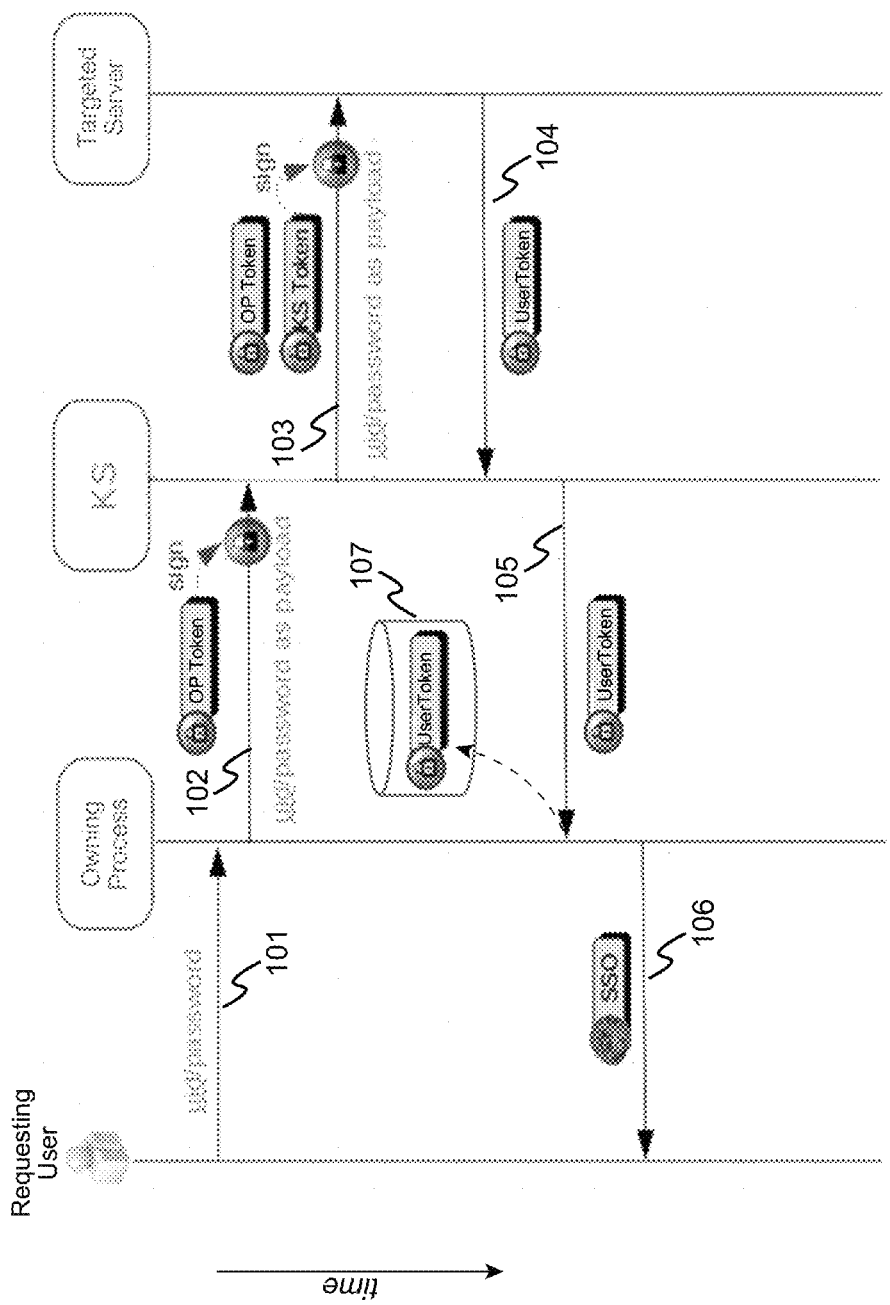
FIG. 2 depicts a detailed logical process of one available embodiment of the present invention.

The foregoing general process according to the invention may be realized in a variety of logical processes, as will be appreciated by those skilled in the art. We now present a specific embodiment, one of many available, which is provided for greater illustration, but is not intended to be interpreted as a limitation of the scope of the invention. According to this particular embodiment of the invention, and as illustrated in FIG. 2, a first security token contains user identity and user credentials to represent the user who is requesting services from a server, where the term "user" may refer to a device being operated by a human user or it may be another server process. A second security token contains two other identities, a first identity which identifies the token issuer, and a second identity which identifies the owning process.

For this particular example, FIG. 2 shows the scenario in which a user first logs in (101). Because the user has not previously authenticated to the owning server, owning process (OP) or to the targeted server, no user security token has been created or issued by the targeted server yet. Hence, the access request is actually made by the owning server, or "Inlet process", on behalf of the user. As shown in FIG. 2, the owning process sends a token (OP Token) representing the owning process, not the user, to the targeted server initially, via any downstream servers. Generally speaking, the targeted server then, using the user's ID and password, issues a User Token, which is returned (104, 105) to the owning process. However, the user token is not sent to or exposed to the user, thereby protecting it, but instead, a token or cookie, such as a single sign on cookie (SSO) is sent (106) by the owning process to the user. The owning process stores (107) the user token for future use, as shown in FIG. 3.

Figure 3:
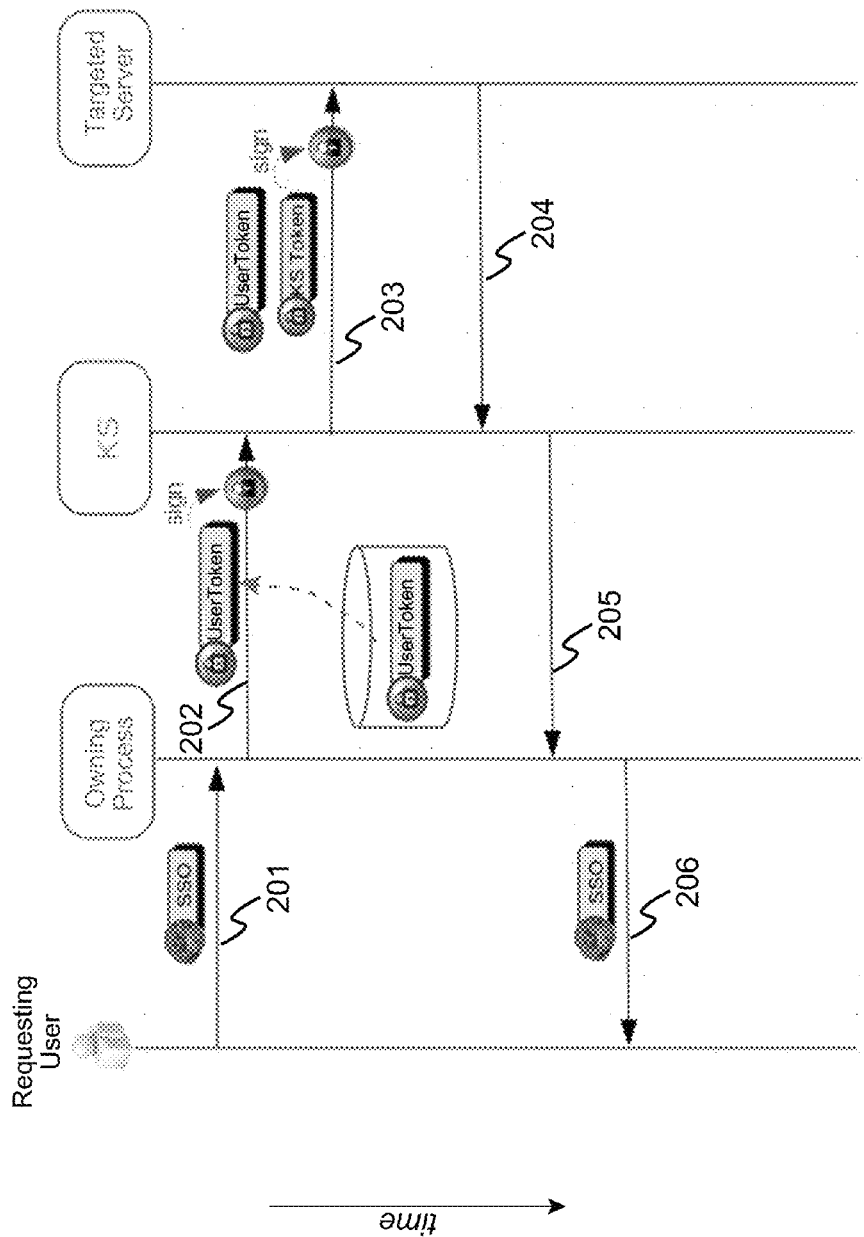
FIG. 3 shows the logical process for subsequent access by the requesting user of the targeted service corresponding to the authorization process depicted in FIG. 2.
Figure 4:
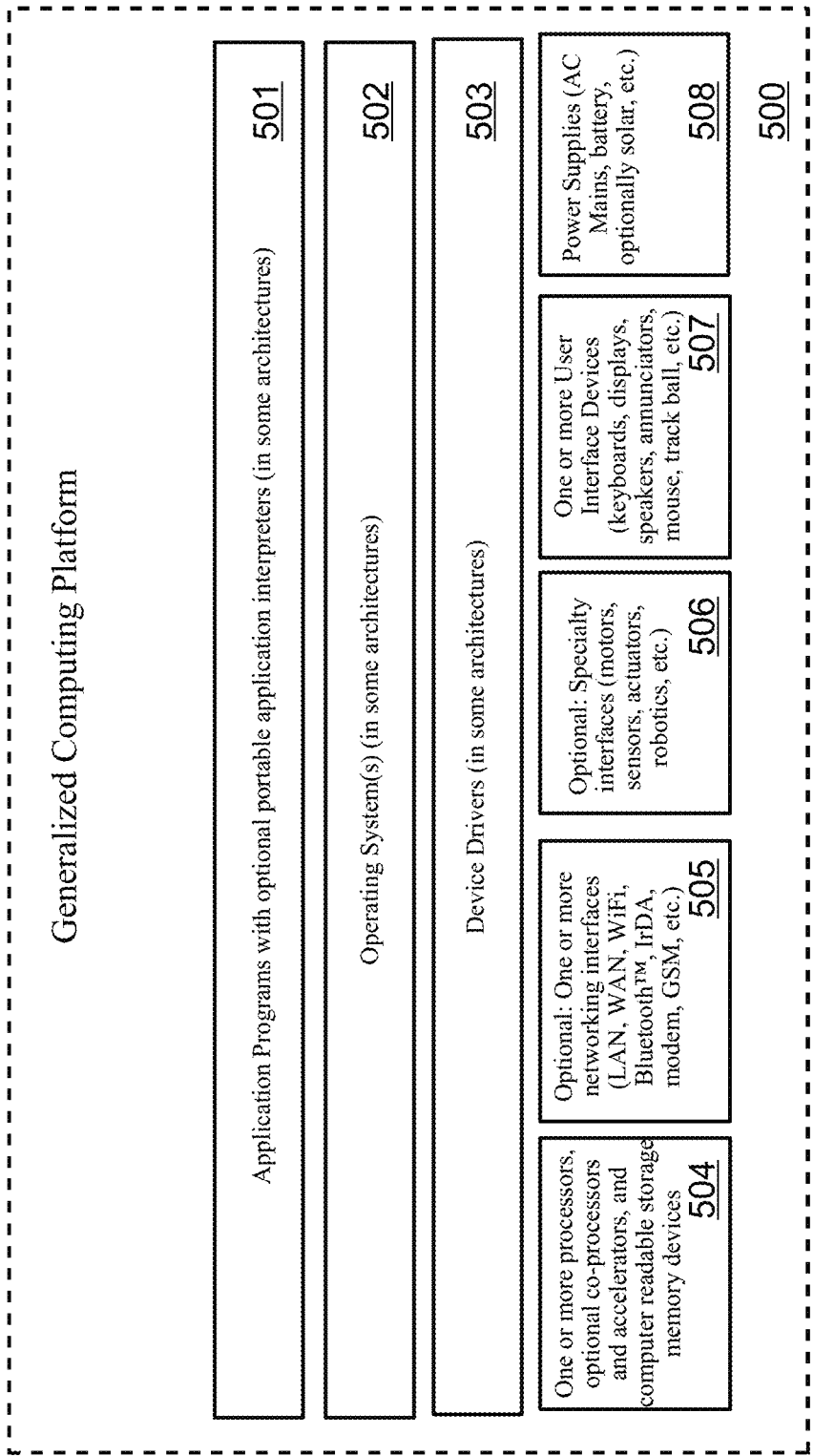
FIG. 4 sets forth a generalized architecture of computing platforms suitable for at least one embodiment of the present and the related inventions.

Turning to FIG. 3, a scenario is shown subsequent to the user having authenticated to the targeted server, and after the user token has been issued and stored by the owning process. The requesting user supplies (201) the SSO token to the owning process with post-authentication access requests and transactions with the targeted server. Because the token owning process (Inlet process) is storing the user token which is associated with, but not exposed to the user, the owning process can use the user token to make downstream requests on behalf of the already-authenticated user. Note at this point that the user token is not ever been sent to the user, but it has always been kept by the Inlet process which is the owning process of the token. Therefore, when the owning process makes downstream requests on behalf of the user subsequently, Inlet process does not need to send its own server token, because Inlet is the owning process of the user token and hence Inlet can use its server private key to endorse user requests.

Referring again to FIG. 2, during operation of this specific embodiment example, when a user passes (101) his her or its credentials (e.g. user id/password) to an inlet server or owning process (OP) to request services from a targeted server, the first token (OP Token) is generated with the uid/password in its payload, and the first token is signed using the OP's key. The inlet server then forwards (102) this signed token with the service request to the targeted server, potentially through one or more mid-stream servers, such as a kernel service, which will act as a token-owning process.

When the first token is received (102) by a mid-stream server, such as kernel services (KS), the mid-stream server forwards (103) the first security token to indicate who is making the request (as indicated in its payload), and the KS uses its own key to digitally sign the request to indicate that it is endorsing the request, and forwards (103) the signed KS token to the targeted server from which services are being requested.

Single-Hop Operations Example.

Continuing with the specific example from the previous paragraphs, a receiving server accepts a request only under one or more of the following conditions, and preferably under all of the following conditions:

1. the token owning process endorses the request by signing the request;

2. the request message is valid, that the message timestamp has not expired, and the message has not been processed before,
3. the token is valid, e.g., the token is signed by its issuer and the digital signature is verified, and the token is unexpired;
4. the user entity, which can be a real user or a deployment or a server process, that is represented by the token has the authorization to access the specified requested resources; and
5. the owning process of the security token is authorized to endorse the user entity represented by the first token to access the specified requested resources.

If these conditions are met, then the server targeted by the request grants the owning process the privilege to assert the user identity of the first security token, and grants the owning process the privilege to get a User Token for authenticated users. The target server then issues a User Token, preferably compliant with an appropriate level of RSA security, with the Inlet server designated as the owner of the User Token. The User Token is then sent to the Inlet server via the KS (104, 105).

The owning process, which may be an Inlet server, then preferably ensures that the User Token is not forwarded to the user, but instead may optionally issue a Single Sign On (SSO) cookie and may send (106) the SSO cookie to the user.

For future communications between the user and the targeted server subsequent to the user being authenticated to the targeted server and subsequent to the creating of the user token, the SSO cookie may be exchanged for the User Token by the owning process, as shown in FIG. 3. The user, or user's device or user process, submits further communications to the targeted server by attaching the SSO cookie with the sent (201) communications. The owning process does not, however, forward the SSO cookie, but instead looks up the User Token for the user, such as by using the SSO Cookie as an index into a table, and then forwards (202) the communication without the SSO cookie but with the User Token to the KS after signing the communication with the OP key. The KS then endorses the communication by attaching its own signed token and forwarding (203) it to the targeted server. Any response from the targeted server, such as the result of calculations, data processing, or database access, is then sent (204, 205) back to the owning process, which then re-attaches the SSO cookie and forwards (206) the response to the user.

Multiple-Hop Operations.

In another example logical process, or extension to the previously-described example, if the target service needs to forward the request to a downstream server process (e.g. a first "hop"), or if the target service needs to invoke other downstream service on behalf of the original requester, the process where the service resides will send the received security token along with the request and will also send its own token that represents the process. Moreover, the local process will sign the request with its own key that is identified in the server process security token to endorse the requests.

In this scenario, the original token may be referred to as the "caller token", and the second token that endorses the request may be referred to as the "endorsement token".

The target process accepts a multiple-hop request if one or more, and preferably all of the following are determined to be true:

1. the endorsement token-owning process endorses the request by validly signing the request using its owning process private key that is identified in the server process security token;
2. the endorsement token is valid, e.g., token is signed by its issuer and the digital signature is verified, and that the token is within its expiration time;
3. the endorsed message is fresh, i.e., the message timestamp has not expired and the request has not been processed before,
4. the user entity of the caller token, which can be a real user or a deployment or a server process, that is represented by the token has the authorization to access the specified resources; and
5. the endorsement token owning process is authorized to endorse the user entity represented by the token to access the specified resources.

The process can be repeated through additional hops as needed. The original request token remains on the top of the stack of tokens and may be referred to as the caller token. The current server process then adds its own token to the end of the stack of tokens, and uses its own key to sign and to endorse the request as it forwards the request to the next hop. This last token is referred to as the endorsement token. There are one or more server tokens inserted by intermediate server process (each hop) along the request chain. The requests are accepted using the same rules as described in the multiple-hop scenarios.

Qualitative Advantages Over the Known Art.

The present inventors believe that there are a number of advantages of the present invention over the known art. For example, when compared to the process described in U.S. Pat. No. 6,711,679, the following advantages of the present invention are:

1. Embodiments of the invention use a security token to represent the client identity and credentials where the credentials may include security attributes such as user group membership and roles. The security credentials allow downstream servers to use user security attributes to perform fine-grained, policy-based access control.
2. The security token is signed by its issuer and can be verified by downstream servers. The owner of the security token uses its private key to sign some piece of data in the request message header to prove its ownership of the security token. Subsequent servers append their own security tokens, and sign something of the outgoing message to prove security token ownership. Intermediate server security tokens also contain their credential information which can be used by downstream server to perform fine-grained, policy-based access control.
3. Downstream server may assert security roles they have to elevate security credentials of the original requester so as to enable original requester to access protected data that require higher privilege than what the original requester has. This is a major claim of our invention disclosure that sensitive data can be protected following the defense in depth principle that a client is allowed to access sensitive data if and only if the client follow defined server access path and go through multiple tier of token and message validity check, access control check, and optionally one or more times of security credential elevation.

When compared to another known approach, Kerberos Delegation of Authentication (KDA), embodiments of the present invention provide the following advantages:

1. Embodiments of the present invention employ user security tokens which are owned by server entity, which the KDA process does not do.
2. Embodiments of the present invention propagate a stack of security tokens, which a KDA process does not do.
3. Embodiments of the present invention make authorization decisions based not just on user credentials, owning server credentials, or endorsing server credentials, but on a combination of all of these. In other words, the access control depends not only on who a user is, but also on who brings the user into the door (e.g. who endorses the user).

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for controlling exposure of sensitive data using process-bound security tokens comprising:
    receiving by an owning process from a requester a set of user authentication credentials to create a request message to access or communicate to a targeted server, wherein the owning process and the requester are separate computing entities;
    creating and signing with a first token issuer cryptographic key a first security token that is owned by the owning process;
    sending by the owning process to a downstream server the first security token and the request message;
    endorsing the request message by the downstream server by attaching a second security token representing the downstream server, wherein the second security token is signed by a second token issuer cryptographic key;
    sending by the downstream server the endorsed request message to the targeted server;
    responsive to one or more security verifications of the endorsed request message, issuing by the targeted server a user token;

returning the user token to the owning process;
storing and associating by the owning process the user token with a single sign-on token, wherein the single sign-on token is separate from the user token;
sending by the owning process the associated single sign-on token to the requester identified by the user authentication credentials;
thereby preventing exposure of the user token to the requester.

2. The method as set forth in claim 1 wherein the source of the request comprises a user device.

3. The method as set forth in claim 1 wherein the source of the request comprises a user process.

4. The method as set forth in claim 3 wherein the second security token comprises an identification of the token issuer, and comprises an identification of the owning process.

5. The method as set forth in claim 1 further comprising:
subsequent to the sending of the single sign-on cookie to the source of the request, receiving a second request by the inlet server for access to or communication with the target server, wherein the second request has the single sign-on attached;
looking up by the server process the user token associated with the attached single sign-on cookie; and
forwarding the second request with the user token to the key server.

6. The method as set forth in claim 5 wherein further comprising:
endorsing the second request by attaching the second security token signed by the second cryptographic key;
sending the endorsed second request to the targeted server.

7. The method as set forth in claim 6 further comprising:
responsive to one or more security verifications of the endorsed second request, performing by the targeted server a requested access, usage of a resource, or performance of a service according to the second request.

8. The method as set forth in claim 7 further comprising:
responsive to results generation by the access, usage, or service performance, returning the results to the server process with the user token attached;
detaching by the server process the user token from the results;
forwarding to the source of the second request the results and the single sign-on cookie.

9. A computer program product for controlling exposure of sensitive data using process-bound security tokens comprising:
a computer-readable storage memory which is not a propagating signal per se;
program instructions embodied by the computer-readable storage memory which cause a processor to, when executed, perform the steps of:
receiving by an owning process from a requester a set of user authentication credentials to create a request message to access or communicate to a targeted server, wherein the owning process and the requester are separate computing entities;
creating and signing with a first token issuer cryptographic key a first security token that is owned by the owning process;
sending by the owning process to a downstream server the first security token and the request message;
endorsing the request message by the downstream server by attaching a second security token representing the downstream server, wherein the second security token is signed by a second token issuer cryptographic key;
sending by the downstream server the endorsed request message to the targeted server;
responsive to one or more security verifications of the endorsed request message, issuing by the targeted server a user token;
returning the user token to the owning process;
storing and associating by the owning process the user token with a single sign-on token, wherein the single sign-on token is separate from the user token;
sending by the owning process the associated single sign-on token to the requester identified by the user authentication credentials;
thereby preventing exposure of the user token to the requester.

10. The computer program product as set forth in claim 9 wherein the source of the request comprises a user device.

11. The computer program product as set forth in claim 9 wherein the source of the request comprises a user process.

12. The computer program product as set forth in claim 11 wherein the second security token comprises an identification of the token issuer, and comprises an identification of the owning process.

13. A system for controlling exposure of sensitive data using process-bound security tokens comprising:
a computing system having a processor;
a computer-readable storage memory which is not a propagating signal per se;
program instructions embodied by the computer-readable storage memory which cause the processor to, when executed, perform the steps of:
receiving by an owning process from a requester a set of user authentication credentials to create a request message to access or communicate to a targeted server, wherein the owning process and the requester are separate computing entities;
creating and signing with a first token issuer cryptographic key a first security token that is owned by the owning process;
sending by the owning process to a downstream server the first security token and the request message;
endorsing the request message by the downstream server by attaching a second security token representing the downstream server, wherein the second security token is signed by a second token issuer cryptographic key;
sending by the downstream server the endorsed request message to the targeted server;
responsive to one or more security verifications of the endorsed request message, issuing by the targeted server a user token;
returning the user token to the owning process;
storing and associating by the owning process the user token with a single sign-on token, wherein the single sign-on token is separate from the user token;
sending by the owning process the associated single sign-on token to the requester identified by the user authentication credentials;
thereby preventing exposure of the user token to the requester.

14. The system as set forth in claim 13 wherein the source of the request comprises a user device.

15. The system as set forth in claim 13 wherein the source of the request comprises a user process.

16. The system as set forth in claim 15 wherein the second security token comprises an identification of the token issuer, and comprises an identification of the owning process.

\* \* \* \* \*